(12) United States Patent
Raghavan et al.

(10) Patent No.: US 8,356,294 B2
(45) Date of Patent: Jan. 15, 2013

(54) CONTROLLING AND EXTENDING PROGRAMMABLE NETWORK FUNCTIONS USING A DECLARATIVE APPROACH

(75) Inventors: Kollivakkam Raghavan, Saratoga, CA (US); Venkateswara Siramdas, Sunnyvale, CA (US); Ramakrishna Reddy Kandula, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1730 days.

(21) Appl. No.: 11/706,581

(22) Filed: Feb. 13, 2007

(65) Prior Publication Data

US 2008/0196010 A1      Aug. 14, 2008

(51) Int. Cl.
*G06F 9/445* (2006.01)
*G06F 9/44* (2006.01)

(52) U.S. Cl. .................. 717/174; 717/117; 717/176

(58) Field of Classification Search .................. None
See application file for complete search history.

(56) References Cited

U.S. PATENT DOCUMENTS

| | | | |
|---|---|---|---|
| 6,708,324 B1 | 3/2004 | Solloway et al. | |
| 7,054,924 B1* | 5/2006 | Harvey et al. | 709/220 |
| 7,516,198 B1* | 4/2009 | Appala et al. | 709/219 |
| 2003/0188040 A1 | 10/2003 | Vincent | |
| 2004/0128498 A1 | 7/2004 | Lang et al. | |
| 2004/0250247 A1 | 12/2004 | Deeths et al. | |
| 2006/0136555 A1 | 6/2006 | Patrick et al. | |
| 2006/0200458 A1* | 9/2006 | Sankar | 707/4 |
| 2006/0288404 A1* | 12/2006 | Kirshnan et al. | 726/5 |
| 2007/0088707 A1* | 4/2007 | Durgin et al. | 707/10 |
| 2007/0289005 A1* | 12/2007 | Kumar et al. | 726/10 |

OTHER PUBLICATIONS

Snoeren et al., "Mesh-Based Content Routing using XML," ACM, 2001.*
Mascolo et al., "XMILE: An XML based Approach for Programmable Networks," 2001.*
Cisco AON Programming Guide, AON Release 1.1, Oct. 2005.*
U.S. Appl. No. 11/441,594, May 26, 2006, Final Office Action, Mailing Date May 11, 2010.

* cited by examiner

*Primary Examiner* — Insun Kang
(74) *Attorney, Agent, or Firm* — Hickman Palermo Truong Becker Bingham Wong LLP

(57) ABSTRACT

In an embodiment, a computer apparatus comprises a network interface; a processor; a packet forwarding unit; and instructions which when executed cause storing a first executable software module in computer storage; receiving and storing, in association with the first software module, a first human-readable declaration of one or more available extension points within the first software module; receiving and storing an extension software module that implements a particular one or more of the extension points; installing and executing the first software module and the extension software module; and invoking the extension software module when the particular extension point is reached during execution of the first software module. In an embodiment, a declaration of extension points enables extending a software module while running in a host, by registering an extension matching the extension points, yet the author of the extension does not need to access any code of the extended module.

24 Claims, 5 Drawing Sheets

CONTROLLING AND EXTENDING PROGRAMMABLE NETWORK FUNCTIONS USING A DECLARATIVE APPROACH

CROSS-REFERENCE TO RELATED APPLICATION

The present application is related to prior application Ser. No. 11/441,594, filed May 26, 2006, "Extensible Authentication and Authorization of Identities in an Application Message on a Network Device," of Vinod Dashora et al., the entire contents of which is hereby incorporated by reference as if fully set forth herein.

FIELD OF THE INVENTION

The present disclosure generally relates to programming and managing routers, switches and other network devices. The disclosure relates more specifically to techniques for controlling and extending functions of such devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer networks generally comprise infrastructure devices or elements, such as routers and switches, and end station devices, such as servers, workstations, personal computers, handheld computers, and printers. The introduction of Application Oriented Networking (AON) devices from Cisco Systems, Inc., San Jose, Calif., has provided more flexibility in how network infrastructure elements process application-layer messages (that is, messages of OSI Layer 5, 6, and above).

While AON devices provide implementations of many application protocols and standards, many business enterprises have other infrastructure devices or end station devices that use legacy code or custom code and proprietary formats or protocols that need to be supported. In other cases, the AON devices may omit support for a particular database type or other standard scheme that the enterprises need. In past approaches, extension of AON device capabilities has required re-implementing an entire code module. For example, the AON Authentication bladelet provides support for standard LDAP and Kerberos-based authentication, but if an enterprise wants to use Netegrity SiteMinder for authentication, the enterprise is required to re-implement the entire authentication bladelet using custom code.

In past approaches, extending the behavior of a programmatic capability requires the code implementing that capability to be exposed to a customer of the networking vendor that is facilitating the extension. For example, code developed using the JAVA programming language typically provides interfaces of abstract classes that users extend to customize the behavior of the JAVA program.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
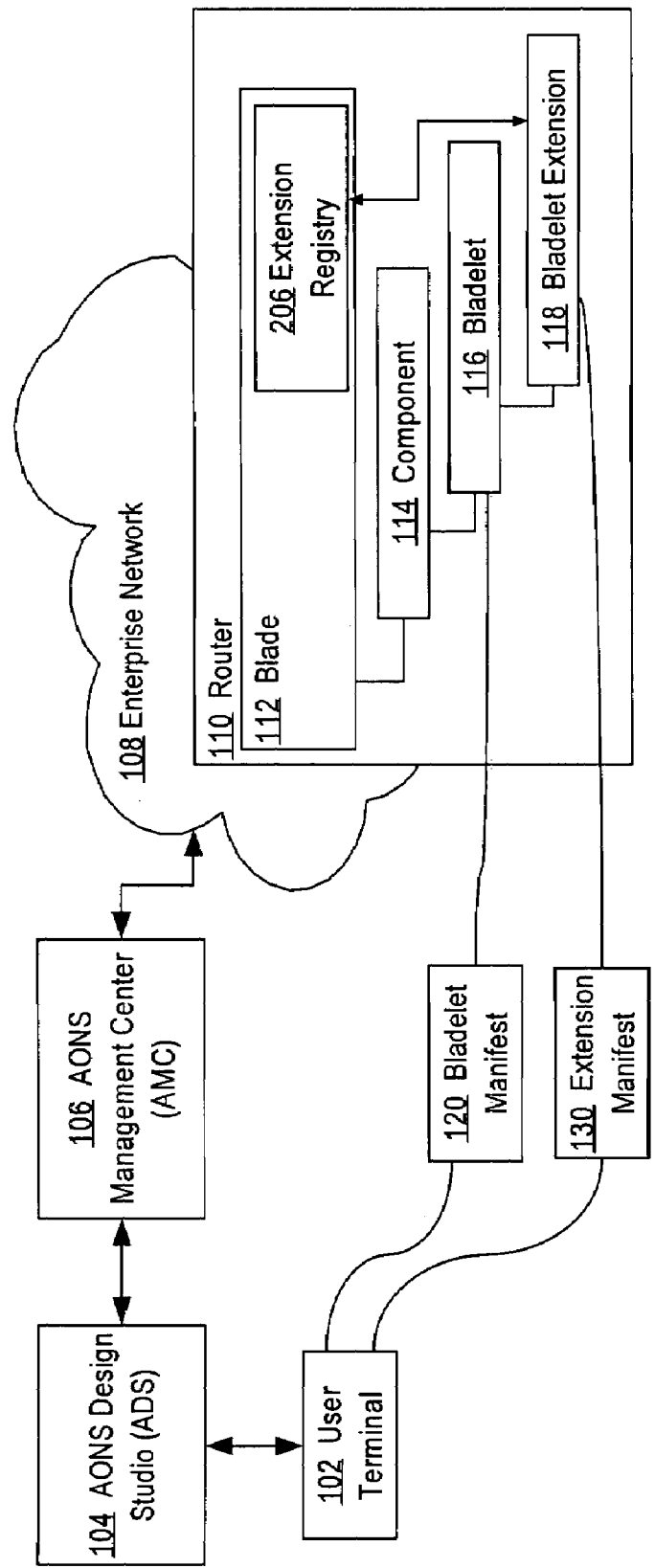
FIG. 1 illustrates an example network arrangement in which an embodiment may be used.

Controlling and extending programmable network functions using a declarative approach is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

With the approach herein, in a networking device existing logic to perform operational functions can be reused, but an enterprise or customer can extend the built-in functionality without compromising the reliability of the original implementation. In an embodiment, built-in capabilities provided by AON network nodes can be extended using a declarative approach and without enterprise users to have access to the code that implements the extended capability.

Embodiments are described herein according to the following outline:

1.0 General Overview
2.0 Structural and Functional Overview
3.0 Implementation Mechanisms-Hardware Overview
4.0 Extensions and Alternatives
1.0 General Overview The needs identified in the foregoing Background, and other needs and objects that will become apparent for the following description, are achieved in the present invention, which comprises, in one aspect, a computer apparatus comprises a network interface; a processor; a packet forwarding unit; and instructions which when executed cause storing a first executable software module in computer storage; receiving and storing, in association with the first software module, a first human-readable declaration of one or more available extension points within the first software module; receiving and storing an extension software module that implements a particular one or more of the extension points; installing and executing the first software module and the extension software module; and invoking the extension software module when the particular extension point is reached during execution of the first software module.

In an embodiment, a declaration of extension points enables extending a software module while running in a host, by registering an extension matching the extension points, yet the author of the extension does not need to access source or even executable code of the extended module, in contrast to past approaches that require access to binary code in the form of a DLL or JAVA JAR file. Thus, in the present approach, an extension can be written without any compile-time dependency on the parent plug-in.

One feature comprises storing the available extension points of the first software module and information about the extension software module in a registry of extensions; and, when the particular extension point is reached, querying the registry whether the extension software module is registered for the particular extension point.

Another feature comprises receiving and storing a second human-readable declaration of one or more of the extension points that are implemented; determining, based on the second declaration, that the extension software module extends the first software module; and storing the information about the extension software module in the registry of extensions in association with information about the first software module.

In another feature, the first software module and the first declaration are associated with a first business enterprise and the extension software module and the second declaration are associated with a second business enterprise. In a further feature, the apparatus comprises any of a router or a switch. In another feature, the apparatus comprises any of a router or a switch, and the sequences of instructions are executed in a blade of the router or switch.

In another feature, the first software module comprises a bladelet of an AON blade of a router or a switch, and wherein the extension software module comprises a bladelet extension.

In a further feature, the first declaration comprises an XML file comprising extension point tags that identify programmatic interfaces of the software module.

Still another feature comprises receiving the extension software module from an entity that cannot access a human-readable version of the first software module but can access the first declaration.

In other aspects, the invention encompasses a machine-implemented method and a computer-readable medium configured to implement the functions described herein.

2.0 Structural and Functional Overview

In an embodiment, a declarative approach for controlling and extending programmable network functions allows a parent software component that is allowing a programmatic extension to control how the parent software component can be extended using a text declaration having named extension points. In an embodiment, the text declaration is an XML file associated with the parent software component. Further, any other parent component can use the same extension if that parent component exposes the same extension point. An existing component or a new component can take advantage of newly developed capabilities. Two completely independent components can use the same extensions, potentially provided by a third party, merely by declaring and using the same extension point.

The approach enables multiple components to reuse the same programmatic extension without additional coding. For example, if an extension providing connection pooling for databases is registered in the system, then all components that use database connectivity can use the extension automatically.

The extension automatically uses the configuration and management capabilities that have been provided for the parent component.

The approach simplifies and retains the sanctity of the parent component by not requiring any of the parent component code to be exposed to the extension.

When the extension requires some form of software licensing from a third party associated with the capability reflected in the extension, the approach herein does not require the parent component to also enter into a licensing agreement, because the extension does not have to be shipped with the parent component. As a result, the enterprise or customer is the sole party that needs a license. For example, AON blades support accessing an external database using JDBC, but database-specific functions may be implemented as extensions that are customer-installed and licensed. As a result, the AON blades do not require a database driver and associated license from a vendor of the database software; instead, the enterprise or customer is responsible for obtaining required licenses. For example, the enterprise or customer creates code that can connect the enterprise's IBM DB2 database to the AON blade using JDBC, and the enterprise or customer has sole responsibility for obtaining any needed license from the vendor of DB2. This results in significant cost savings for the vendor of the AON blade, which otherwise would have to obtain a license for every AON blade even if a customer did not need the licensed capability.

The approach herein also minimizes the extra work needed to extend a capability of a parent component, and maximizes the reuse of code in the original implementation of the parent component. No design constraints are imposed on the parent component or the extension, so that each can evolve independently.

Examples of functions of programmable networking devices that can be extended using the approach herein include security functions, authentication, authorization, access to a database, logging of messages, load balancing algorithms, etc. For example, a Log bladelet of an AON networking device could be extended to log messages to different destinations, such as syslog, remote log servers, etc. rather than logging to a database having a fixed schema.

In an embodiment, the approach is implemented using a user-interface specific language that allows the specified functionality to be declared by a parent component and to be extended by the extension. A runtime mechanism is provided to load and manage the lifecycle of the extension on a network device at runtime. Lifecycle management may involve hot deployment at runtime, version management, sandboxing, and removal. A configuration-management framework enables extensions to be managed using update, create, or delete operations.

FIG. 1 illustrates an example network arrangement in which an embodiment may be used. A user terminal 102 is communicatively coupled to AONS Design Studio (ADS) 104, which provides a graphical user interface that enables a user of the user terminal to define software plugins and manage the plugins. The ADS 104 is coupled to an AONS Management Center (AMC) 106, which is configured to install software components into network devices of an enterprise network 108 in response to requests from the ADS. Enterprise network 108 typically comprises one or more routers, switches and other networking infrastructure devices of which router 110 is illustrated as an example.

Router 110 hosts software elements that implement programmable functions such as application-layer message inspection, classification, and manipulation. Software components within router 110 are organized hierarchically in layers or levels. Router 110 may comprise one or more blades 112. A blade 112 is the top-level component and an example of a blade is an AON blade from Cisco Systems, Inc. Blade 112 may comprise one or more components 114, which are software modules that implement particular functions or groups of functions.

Each component 114 comprises one or more bladelets 116 that implements sub-functions or specialized functions. Each bladelet may comprise one or more bladelet extensions 118 that extend the functions of a component or bladelet.

As used herein, the term "plugin" or "bundle" means a structured archive of computer program code that contributes a function to the system shown in FIG. 1. An "extension point" is a well-defined place in a component 114 or bladelet 116 in which other plug-ins can add functionality. For example, an extension point may be a unique named attribute that is defined by bladelet 116 or bladelet extension and that has published semantics. An "extension," as represented by bladelet extension 118, is a code contribution to an extension point. Thus, a bladelet extension is an implementation of one or more extension points of a bladelet. A bladelet extension may define its own extension points. Extensions to an extension point are also referred to as bladelet extensions.

Further, a "parent bladelet" is a bladelet whose extension point is extended by a bladelet extension. If the extension point belongs to a bladelet extension, then the bladelet extension is the parent bladelet of the extension.

In an embodiment, a vendor of router 110 typically supplies blades 112, components 114, and may also provide bladelets 116 and bladelet extensions 118 to an enterprise that owns or operates the enterprise network 108. In contrast, the enterprise is involved only in creating and deploying bladelet extensions 118 and possibly bladelets 116.

A bladelet can have any number of extensions, each of which can extend any number of extension points. In an embodiment, each instance of a bladelet has only one extension for that instance.

The user terminal 102 is typically associated with a network administrator of that enterprise. A user of terminal 102 interacts with ADS 104 to create a bladelet manifest 120 for each bladelet 116 that the user wishes to design and install in the system. The user also interacts with ADS 104 to create an extension manifest 130 for each bladelet extension 118 that the user wishes to install. AMC 106 installs the manifests 120, 130 and corresponding bladelet 116, bladelet extension 118 in the system using the techniques further described herein.

In an embodiment, an extension manifest 130 comprises declarative text that the AMC 106, blade 112, component 114, bladelet 116, and bladelet extension 118 can parse to determine how to install a plugin associated with the extension manifest. In an embodiment, an extension manifest 130 comprises an XML file having the general form of TABLE 1.

TABLE 1

EXAMPLE EXTENSION MANIFEST

```
<plugin name= "" id= "" version = "" ...>
  <requires>
    <import plugin = "" version = ""/>
  </requires>
  <extension-point name = "" id = "" interface = "" />
  <extension point = "" name = "" id = "">
    <ANY>
  </extension>
<plugin>
```

An extension manifest may specify extensions to the graphical user interface of ADS 104 so that GUI forms, parameter lists, and other GUI widgets will include values associated with the plugin or extension. Thus, if a particular bladelet extension 118 provides user-configurablle parameters that are not offered in a parent component 114, then the extension manifest 130 may declare the user-configurable parameters. In response, the ADS GUI automatically display the parameters to the user of user terminal 102 so that appropriate parameter values can be entered and have effect when the bladelet extension 118 is installed in router 110. For example, a plugin that adds to the ADS configuration may have the example form given in TABLE 2.

TABLE 2

EXAMPLE EXTENSION MANIFEST PROVIDING GUI EXTENSION

```
<plugin name= "" id= "" version = "" ... class = "">
  <requires>
    <import plugin = "" version = ""/>
  </requires>
  <extension-point name = "" id = "" interface = "" />
  <extension point = "" name = "" id = "">
    <bladelet-extension name = "" validatorClass = "" ...>
      <bladelet-design>
        <parameter path= "CG3/CSG2/PG1" name= "" .../>
  </extension>
<plugin>
```

As indicated in Table 2, a manifest for a bladelet extension can specify a new set of parameters that the ADS 104 shall display. The manifest also can declare a "validator class," which is a class that ADS 104 must use to validate user input of parameter values particular to the bladelet extension. When a validator class is declared, ADS 104 invokes the extension validation class in addition to the validation method of the parent bladelet.

Similarly, bladelet manifest 120 may declare, for bladelet 116, how information about the bladelet should be presented in the GUI of ADS 104 using the form shown in TABLE 3, as an example:

TABLE 3

EXAMPLE BLADELET MANIFEST PROVIDING GUI INFORMATION

```
<bladelet-info>
  <bladelet>
    <extension-point name = "" id = "" interface = "" />
    <bladelet-design>
      ...
      <configuration-group name = "" ...>
      ...
      </configuration-group>
    </bladelet-design>
  </bladelet>
</bladelet-info>
```

Using the approach of Table 3, a bladelet manifest 120 declares the configuration group to which the bladelet 116 belongs. In this context, a configuration group is a highest-level grouping of parameters that ADS 104 displays in a tree view display as part of a bladelet parameter dialog. Configuration groups may comprise configuration subgroups, which are displayed as tabs in the GUI. Parameter groups represent a third level of grouping and allow related parameters to be grouped together. In the approach herein, a manifest can declare, for an extension, how to add configuration information at each level of the bladelet configuration hierarchy (configuration group, subgroup and parameter group).

In an embodiment, AMC 106 maintains a copy of each bladelet extension 118 in a separate versioned location. AMC 106 provides a mechanism for any bladelet 116 to register and upload a bladelet extension 118. Bladelet extensions 118 are deployed to networking devices from the AMC 106.

In an embodiment, blade 112 of router 110 loads and initializes bladelets 116 and bladelet extensions 118 at runtime. Alternatively, a lazy loading approach may be used in which loading is deferred and loading of multiple bladelets and extensions occurs at a scheduled time or when processor load is minimal. In an embodiment, blade 112 can execute a parent bladelet and its extensions in an interleaved manner. The parent bladelet defines when an invocation of an extension function should occur.

In an embodiment, a bladelet extension 118 inherits the same security restrictions or "sandbox" as a parent bladelet 116. Thus, a bladelet extension 118 can access all resources of the parent bladelet 116, but only those resources.

Referring again to FIG. 1, blade 112 also hosts an extension registry 206 that stores information about all bladelets 116 and associated bladelet extensions 118. The registry or other data storage in blade 112 may also store the number of routers or other devices that are using a particular bladelet 116 or bladelet extension 118; the number of updates received for a bladelet extension; the last update time for a bladelet and its extensions; an identifier of the last update received; and other information that may be useful in management of the system.

In an embodiment, bladelet extensions 118 may be packaged in SCAR files when created in AMC 106 using ADS 104 in communication with user terminal 102. In an embodiment, a SCAR file comprises extension-info files such as manifests, supporting files, attribute domain files, and JAR files for code that implements the bladelet extension 118.

Figure 2:
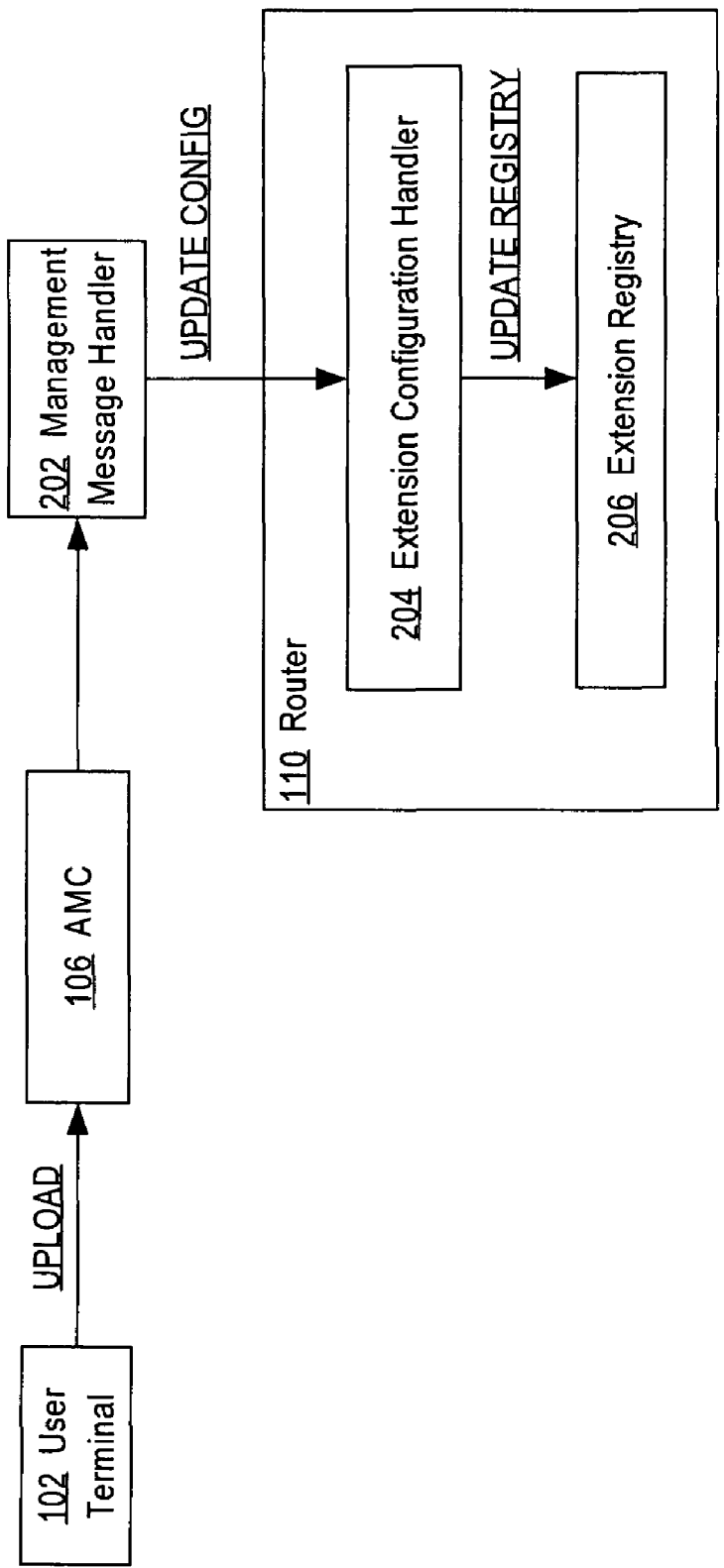
FIG. 2 illustrates a process of loading a bladelet extension into an operating networking device, in an embodiment.

FIG. 2 illustrates a process of loading a bladelet extension into an operating networking device, in an embodiment.

Loading a bladelet extension is initiated when user terminal uploads the bladelet extension to AMC 106. AMC 106 informs a management message handler 202, which may inform a part of AMC 106 that a new extension is ready. Management message handler 202 communicates an UPDATE CONFIG message to extension configuration handler 204, which is hosted in router 110, for example, as part of blade 112.

The extension configuration handler 204 communicates an UPDATE REGISTRY message to an extension registry 206 also hosted in router 110. As a result, information about the new extension becomes registered in the router 110 and blade 112 so that all sub-components of the blade can learn about the new extension.

Figure 3:
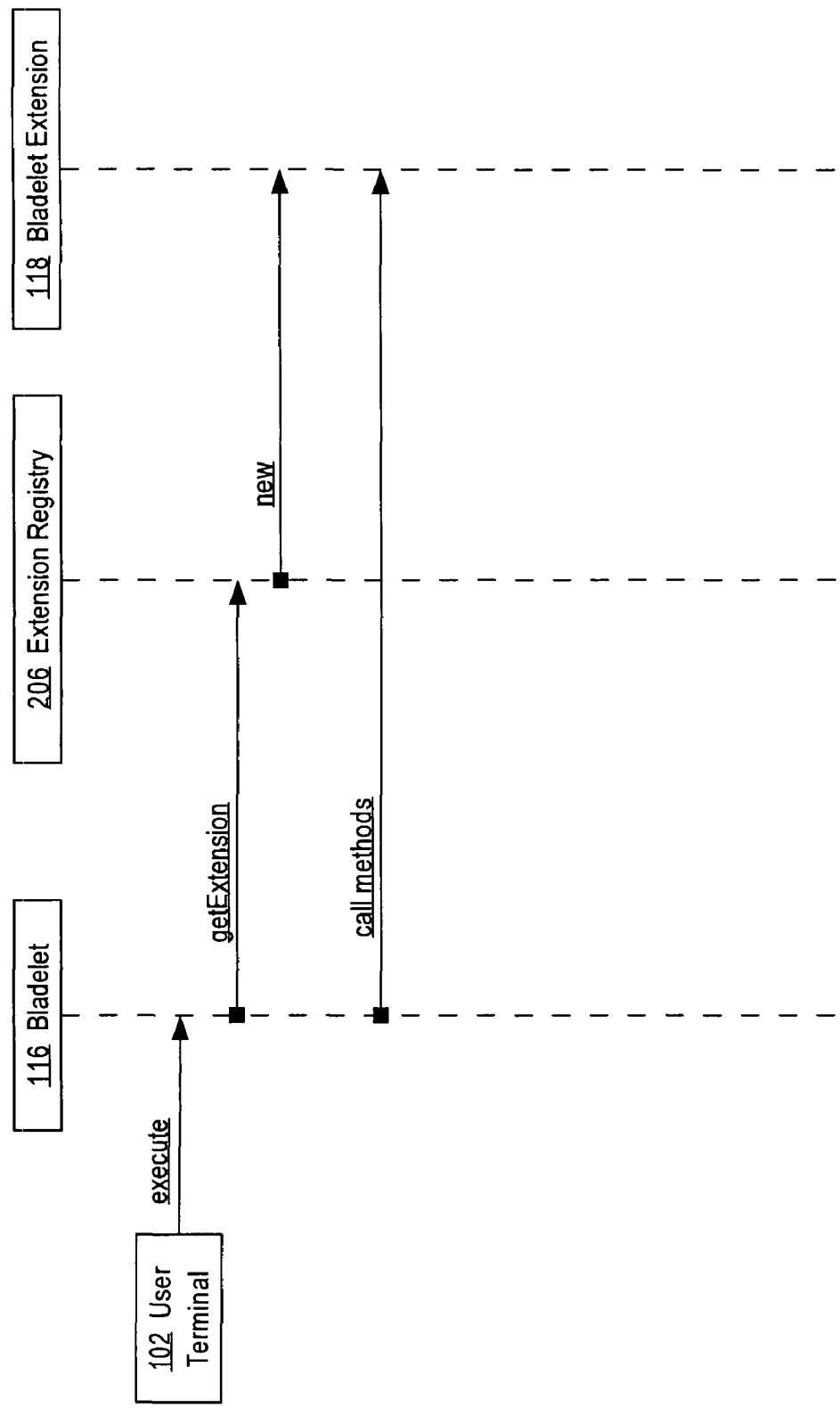
FIG. 3 illustrates a process of executing a bladelet with an extension, according to one embodiment.

FIG. 3 illustrates a process of executing a bladelet with an extension, according to one embodiment.

Bladelet execution initiates when a flow executor, such as a user of user terminal 102, instructs a bladelet 116 to begin executing a flow. In this context, "flow" refers to a set of one or more bladelets and sub-components that interoperate to implement a particular application-layer function in a networking infrastructure element. For example, a flow might define a particular method of detecting a FIX format message, transforming the message to an alternate format, and providing the transformed message to another system.

Bladelet 116 then calls a getExtension method of extension registry 206 to determine whether the bladelet has any extensions. Extension registry 206 looks up the bladelet 116 in the registry and determines that bladelet extension 118 extends the bladelet 116, and that the bladelet extension is newly installed. Extension registry executes a "new" method which results in contacting the bladelet extension 118 to verify that the extension is operable.

Bladelet 116 then calls one or more methods of bladelet extension 118 to implement the functions of the bladelet extension. The writer of code for the bladelet 116 is presumed to know about any extension points that have been declared for the bladelet, and is expected to write any methods associated with the extension points to invoke any bladelet extension when present. Thus, for example, code at an extension point can comprise logic for checking whether a bladelet extension is present and invoking the extension using the getExtension method and, if a FALSE result is received, performing default logic, skipping past the extension point, or performing exit processing with an error.

In this approach, if an existing bladelet 116 does not use extensions, then no changes are needed to the bladelet when an extension is installed. If a bladelet extension 118 does not need configuration to occur using ADS 104, then the bladelet extension can omit the "bladelet-design" tags and associated information in its manifest. Further, if there is a plugin A that is dependent on custom bladelet B and the custom bladelet B is updated at runtime, then A will continue to work with the prior version of bladelet B.

Figure 4:
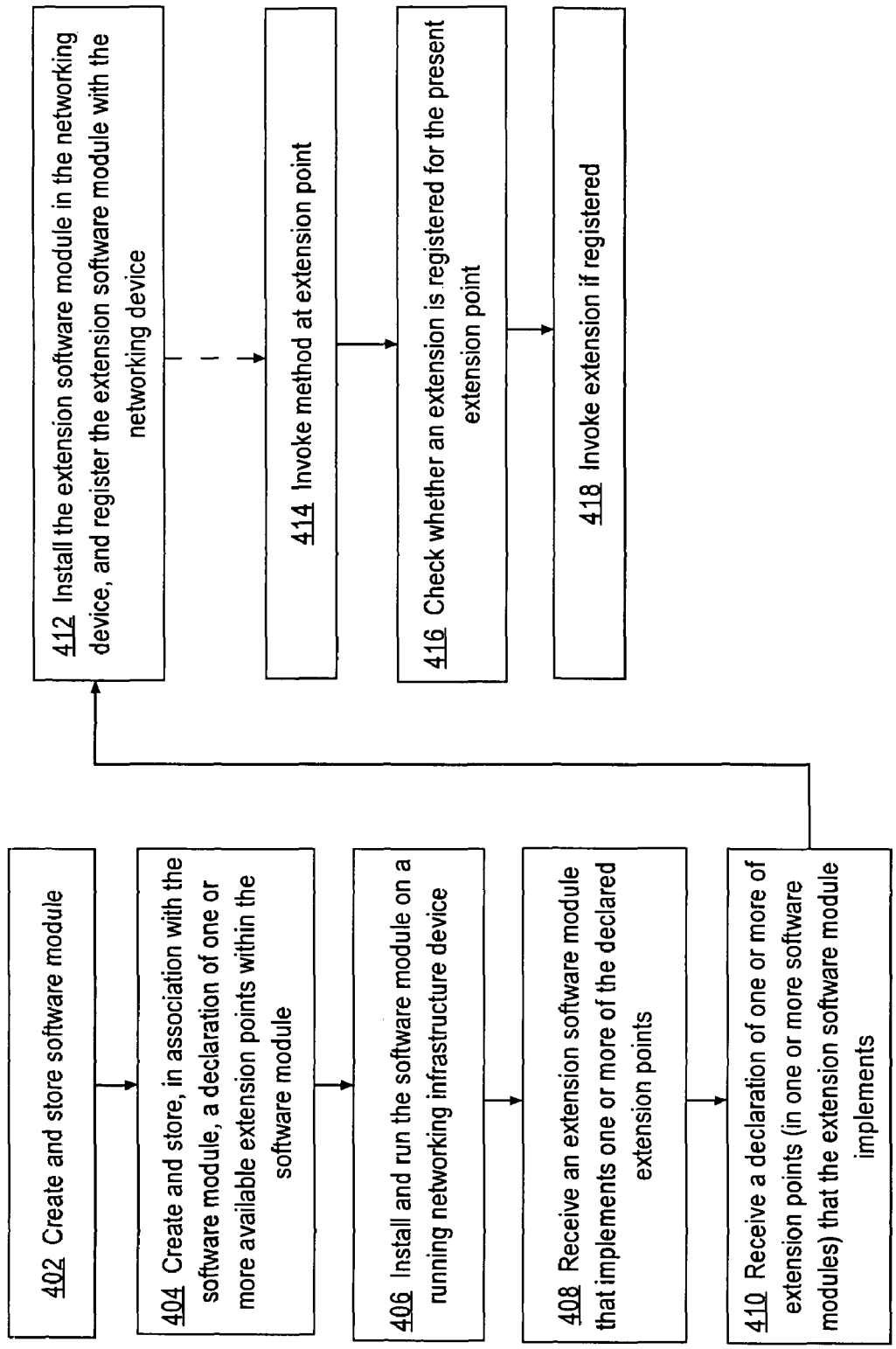
FIG. 4 illustrates a method of controlling and extending programmable network functions using a declarative approach.

FIG. 4 illustrates a method of controlling and extending programmable network functions using a declarative approach. For purposes of illustrating a clear example, some of the context of FIG. 1-3 is referenced in the following description. However, the broad approach of FIG. 4 is not limited to the particular context of FIG. 1-3 or the preceding description of FIG. 1-3.

In step 402, a software module is created and stored. For example, a JAVA computer program comprising a bladelet 116 is created and stored in AMC 206.

In step 404, a declaration of one or more available extension points within the software module is created and stored in association with the software module. In an embodiment, only the author or enterprise associated with creating the software module at step 402 is involved in declaring available extension points in step 404, because only that author or enterprise typically has access to the human-readable source code of the software module. Extension points may identify methods, interfaces, or other points that can be extended.

In an embodiment, the declaration of step 404 comprises a text file such as an XML file and is packaged together with a version of the software module that can be executed or interpreted. However, the term "stored in association" in step 404 does not require packaging the declaration and the software module in the same file, and any form of associating the information may be used.

In step 406, the software module is installed and run on a running networking device. Alternatively, the software module can be shipped with the networking device and the software module can become active when the networking device is turned on and booted up.

In step 408, an extension software module is received that implements one or more of the declared extension points. The extension software module is typically prepared by a party other than the author or enterprise associated with the original software module of steps 402-406, but this is not required.

In step 410, a declaration is received of one or more extension points, in one or more software modules, which the extension software module implements. The declaration can identify the same extension points as in step 404 or can identify those extension points as well as other extension points of other modules. Thus, a particular extension can extend multiple software modules, promoting re-use of code.

In an embodiment, neither the declaration of step 404 nor the declaration of step 410 comprise programming code, but are provided as text-based declarations. For example, structured XML files can be used in which XML tags identify and delimit extension points of a software module by name, interface, etc. Thus, preparing the declarations does not require programming. Further, it is possible for an end user of a computer network to receive a programmable networking device with a set of pre-installed software modules from a networking equipment vendor, to obtain extension software modules from a third party, and to install the extension software modules and thereby extend the functions of the original networking device without the end user performing any programming.

In step 412, the extension software module is installed in the networking device and registered with the networking device. In registration, a data repository in the networking device such as extension registry 206 receives information identifying the name of the extension software module, the software module(s) that it extends, and the associated extension points.

At some point thereafter, at step 414, invocation occurs of a programmatic method at one of the extension points that was declared for the software module at step 404. In response, at step 416, the software module checks whether an extension is registered for the present extension point. Thus, at runtime, a particular module contains logic at each extension point to test whether an extension has been installed for that extension point, since the module cannot "know" when it is originally installed whether any extensions are registered in the future. At step 418, the extension is invoked if an extension is registered.

The preceding description has disclosed controlling and extending programmable network functions using a declarative approach that provides many benefits over past approaches. The approach permits a single extension point implementation to be used by any component that exposes the same extension point in a declarative manner without writing any code. This approach permits an existing component or a new component to take advantage of capabilities that exist without requiring that code to be present at the time of creating the component.

In an embodiment, the approach has the benefit of automatically using the configuration and management capabilities that have been provided for the parent component. The approach simplifies and retains the sanctity of the parent component by not requiring any of the parent component code to be exposed to the extension. The approach can also result in significant cost savings by not requiring special licensed software libraries to be shipped with the networking device in order to support new capabilities.

The approach herein also minimizes the extra work needed to extend a capability of a parent component, and maximizes the reuse of code in the original implementation of the parent component. No design constraints are imposed on the parent component or the extension, so that each can evolve independently.

3.0 Implenentation Mechanisms—Hardware Overview

Figure 5:
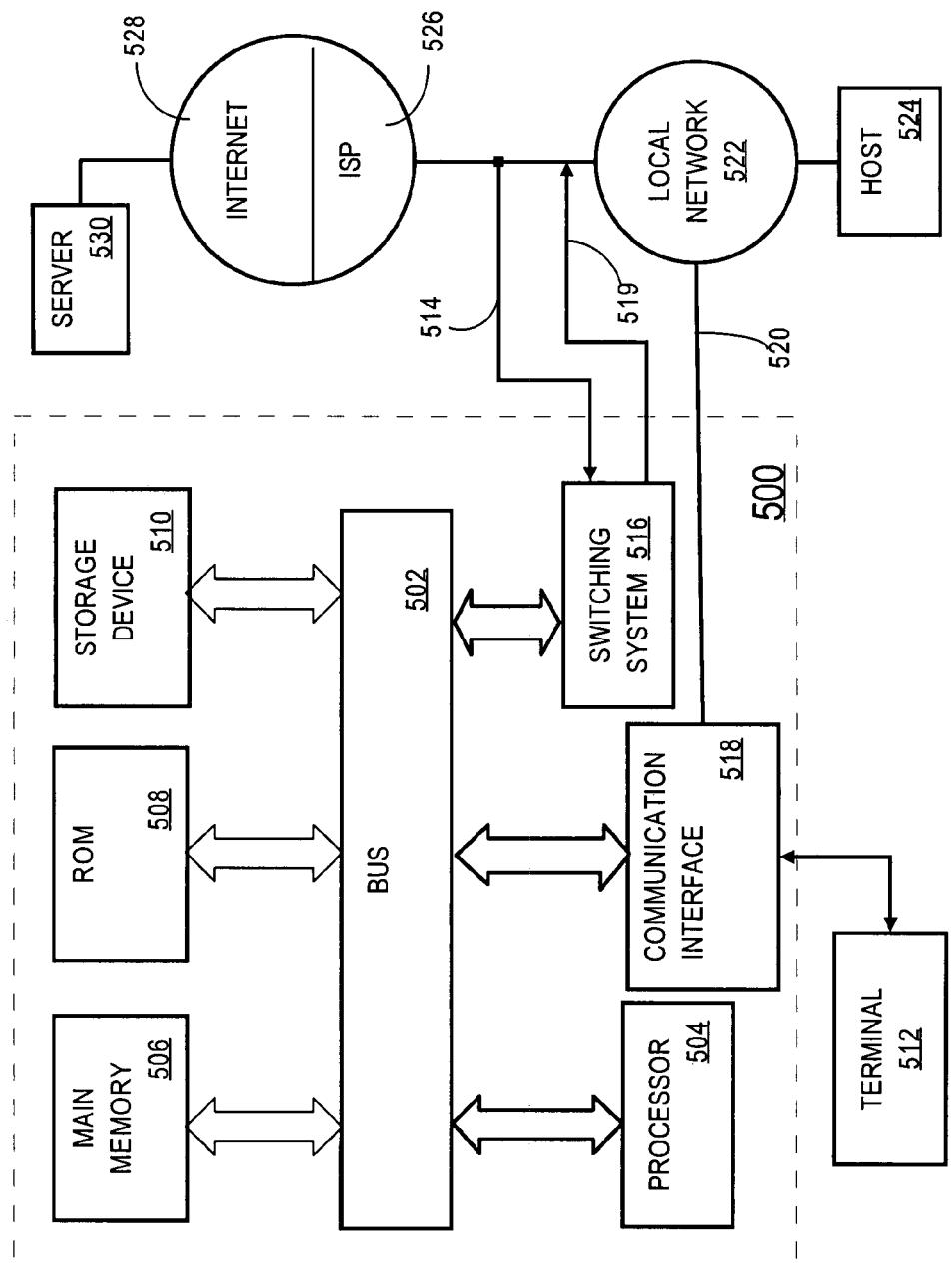
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for controlling and extending programmable network functions using a declarative approach. According to one embodiment of the invention, controlling and extending programmable network functions using a declarative approach is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, al server 530 might transmit a requested code for an application program through Internet 528, ISP 526, local network 522 and communication interface 518. In accordance with the invention, one such downloaded application provides for controlling and extending programmable network functions using a declarative approach as described herein.

The received code may be executed by processor 504 as it is received, and/or stored in storage device 510, or other non-volatile storage for later execution. In this manner, computer system 500 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus comprising:
a network interface that is coupled to a data network for receiving one or more packet flows therefrom;
a processor;
a packet forwarding unit coupled to the processor and network interface and configured to receive one of the packet flows, determine an egress interface for the packet flow, and route the packet flow to the egress interface;
one or more stored sequences of instructions which, when executed by the processor, cause the processor to perform:
storing a first executable software module in a computer storage;
receiving and storing, in association with the first software module, a first human-readable declaration of one or more available extension points within the first software module;
receiving and storing an extension software module that implements a particular one or more of the extension points;
installing and executing the first software module and the extension software module; and
invoking the extension software module when the particular extension point is reached during execution of the first software module.

2. The apparatus of claim 1, further comprising sequences of instructions which, when executed by the processor, cause the processor to perform storing the available extension points of the first software module and information about the extension software module in a registry of extensions; and, when the particular extension point is reached, querying the registry whether the extension software module is registered for the particular extension point.

3. The apparatus of claim 2, further comprising sequences of instructions which, when executed by the processor, cause the processor to perform receiving and storing a second human-readable declaration of one or more of the extension points that are implemented; determining, based on the second declaration, that the extension software module extends the first software module; and storing the information about the extension software module in the registry of extensions in association with information about the first software module.

4. The apparatus of claim 3, wherein the first software module and the first declaration are associated with a first business enterprise and the extension software module and the second declaration are associated with a second business enterprise.

5. The apparatus of claim 1, wherein the apparatus comprises any of a router or a switch.

6. The apparatus of claim 1, wherein the apparatus comprises any of a router or a switch, and wherein the sequences of instructions are executed in a blade of the router or switch.

7. The apparatus of claim 1, wherein the first software module comprises a bladelet of an Applied Oriented Networking (AON) blade of a router or a switch, and wherein the extension software module comprises a bladelet extension.

8. The apparatus of claim 1, wherein the first declaration comprises an XML file comprising extension point tags that identify programmatic interfaces of the software module.

9. The apparatus of claim 1, further comprising sequences of instructions which, when executed by the processor, cause the processor to perform receiving the extension software module from an entity that cannot access a human-readable version of the first software module but can access the first declaration.

10. An apparatus comprising:
a network interface that is coupled to a data network for receiving one or more packet flows therefrom;
a processor;
a packet forwarding unit coupled to the processor and network interface and configured to receive one of the packet flows, determine an egress interface for the packet flow, and route the packet flow to the egress interface;
means for storing a first executable software module in a computer storage;
means for receiving and storing, in association with the first software module, a first human-readable declaration of one or more available extension points the first software module;
means for receiving and storing an extension software module that implements a particular one or more of the extension points;
means for installing and executing the first software module and the extension software module; and
means for invoking the extension software module when the particular extension point is reached during execution of the first software module.

11. The apparatus of claim 10, further comprising means for storing the available extension points of the first software module and information about the extension software module in a registry of extensions; and means for querying the registry, when the particular extension point is reached, whether the extension software module is registered for the particular extension point.

12. The apparatus of claim 11, further comprising means for receiving and storing a second human-readable declaration of one or more of the extension points that are implemented; means for determining, based on the second declaration, that the extension software module extends the first software module; and means for storing the information about the extension software module in the registry of extensions in association with information about the first software module.

13. The apparatus of claim 10, wherein the apparatus comprises any of a router or a switch.

14. The apparatus of claim 10, wherein the first software module comprises a bladelet of an Application Oriented Networking (AON) blade of a router or a switch, and wherein the extension software module comprises a bladelet extension.

15. The apparatus of claim 10, further comprising means for receiving the extension software module from an entity that cannot access a human-readable version of the first software module but can access the first declaration.

16. A machine-implemented method comprising:
storing a first executable software module in a computer storage of a networking infrastructure device;
receiving and storing, in association with the first software module, a first human-readable declaration of one or more available extension points within the first software module;
receiving and storing an extension software module that implements a particular one or more of the extension points;
installing and executing the first software module and the extension software module; and
invoking the extension software module when the particular extension point is reached during execution of the first software module.

17. The method of claim 16, further comprising storing the available extension points of the first software module and information about the extension software module in a registry of extensions; and, when the particular extension point is reached, querying the registry whether the extension software module is registered for the particular extension point.

18. The method of claim 17, further comprising receiving and storing a second human-readable declaration of one or more of the extension points that are implemented; determining, based on the second declaration, that the extension software module extends the first software module; and storing the information about the extension software module in the registry of extensions in association with information about the first software module.

19. The method of claim 18, wherein the first software module and the first declaration are associated with a first business enterprise and the extension software module and the second declaration are associated with a second business enterprise.

20. The method of claim 16, wherein the method is performed in any of a router or a switch.

21. The method of claim 16, wherein the first software module comprises a bladelet of an Application Oriented Networking (AON) blade of a router or a switch, and wherein the extension software module comprises a bladelet extension.

22. The method of claim 16, wherein the first declaration comprises an XML file comprising extension point tags that identify programmatic interfaces of the software module.

23. The method of claim 16, further comprising receiving the extension software module from an entity that cannot access a human-readable version of the first software module but can access the first declaration.

24. A non-transitory computer-readable medium storing one or more sequences of instructions which when executed by one or more processors, cause the one or more processors to perform:
storing a first executable software module in a computer storage of a networking infrastructure device;
receiving and storing, in association with the first software module, a first human-readable declaration of one or more available extension points within the first software module;
receiving and storing an extension software module that implements a particular one or more of the extension points;
installing and executing the first software module and the extension software module; and
invoking the extension software module when the particular extension point is reached during execution of the first software module.

* * * * *